United States Patent

[11] 3,612,422

[72] Inventors Fukuzo Ito
Yokohama-shi;
Masaoki Sekine, Kawasaki-shi, both of Japan
[21] Appl. No. 855,502
[22] Filed Sept. 5, 1969
[45] Patented Oct. 12, 1971
[73] Assignee Tokyo Denki Kagaku Kogyo Kabushiki Kaisha
Chiyoda-ku, Tokyo-to, Japan
[32] Priority Sept. 7, 1968
[33] Japan
[31] 43/64556

[54] CARTRIDGE FOR ENDLESS TAPE

7 Claims, 4 Drawing Figs.

[52] U.S. Cl. .......... 242/55.19 A, 242/197
[51] Int. Cl. .......... B65h 17/48
[50] Field of Search .......... 242/55.19, 197–200, 76, 207–210

[56] References Cited

UNITED STATES PATENTS 3,326,484 6/1967 Yefsky .......... 242/55.19

FOREIGN PATENTS 586,924 12/1958 Italy .......... 242/55.19

*Primary Examiner*—Leonard D. Christian
*Attorney*—Blum, Moscovitz, Friedman & Kaplan

ABSTRACT: An endless tape cartridge having a hub on which a looped endless tape is wound up in a convoluted manner. A hub consists of a driving wheel and a driven wheel constructed rotatably. An endless tape is arranged for being wound up on the outermost periphery of the driven wheel pulled out of the innermost convolution of the tape wound up on the driven wheel, and rewound on the outermost convolution on the periphery of the driven wheel. In addition, an antifriction pad is mounted at the pulling-out position of the tape wound on the outer periphery of the above described driven wheel, while, an engaging slit for leading out the tape is installed on the smooth sheet. In the endless tape cartridge, the tape passes through the engaging slit smoothly to be pulled out.

CARTRIDGE FOR ENDLESS TAPE

DETAILED DESCRIPTION OF THE INVENTION

The present invention relates to an endless tape cartridge for magnetic sound recording and playback by use of magnetic looped tape of an endless array.

Hitherto, when a magnetic looped tape of an endless array is used for a cartridge known as a miniature cassette, the endless tape is wound on a hub to pull out the tape from the innermost convolution of the tape wound on the hub. The pulled-out tape is rewound on the outer periphery of the wound tape on a takeup reel, after passing the wound tape on the periphery of the hub, a tape driving unit and a recording and playback unit, to move the tape continuously in an endless manner. However, this method has the defect that the tape is stretched between the hub and the wound tape on the outer periphery of the hub due to the friction between the hub and the tape from the innermost convolution, as the tape is pulled between the hub and the tape wound in multiplied convolutions on the outer periphery of the hub, especially the tape is wound tightly, as a result, the tape is not supplied smoothly, and continuous operation of the miniature cassette is prevented often. Another defect of this method is such that the wound tape cannot be pulled out with the smooth revolution of the tape and, therefore, the deterioration of the smoothness of the tape is inevitable.

The primary object of e present invention is to provide a mechanism of simple construction to pull the tape out of an endless tape cassette, making the continuous operation of the endless tape cassette very easy, and improving the above mentioned defects.

Another object of the present invention is to provide a cartridge for pulling out the tape in smooth rotation from a hub on which an endless tape is wound, without damaging its smoothness.

Still another object of the present invention is to manufacture cheap cartridges suitable for mass production, in which the correction of the twists of the tape and the reversion of the tape can be done easily, decreasing the damage of the tape, further mitigating the tightening force of the tape effectively.

The gist of the present invention to attain the above mentioned purposes will be given below:

Namely, the cartridge of the present invention is characterized by rotatably mounting a driven wheel on the outer periphery of a driving wheel for taking up the tape, arranging the endless tape as to be wound up on the periphery of the driven wheel, mounting an antifriction pad at the pulling-out position of the tape wound on the above mentioned driven wheel, installing the engaging slit for pulling out the tape on the antifriction pad to pass the tape pulled out from the wound tape through the engaging slit smoothly to take out the tape running in various ways, rewinding then the pulled-out tape on the outer periphery of the wounded tape on the driven wheel.

As the cartridge of the present invention is constituted as above mentioned, the endless tape on the periphery of the hub can be pulled present very smoothly without friction, and the pulled-out tape can be taken up without being pulled in double direction of revolution, ensuring easy and sure takeup of the tape continuously with the rotation of the hub.

In addition, the tightness of the wound tape is mitigated, so there is no fear that the cartridge does not operate or the tape breaks in running. Moreover, the twists of the pulled-out tape are corrected smoothly, guaranteeing the sure continuous operation of the endless tape.

In the cartridge of the present invention, the tape can be pulled out with smooth rotation through the tape pulling-out position. Then, the pulled-out tape is easily and trimly rewound on the multiplied convolutions of the wound tape, on the other hand, the tape can be very easily reversed, without the damage of the tape or the increase of friction.

Meantime, in the cartridge of the present invention, the tape wound up on the hub can be led out during revolution without losing its smoothness and without applying excessive loads on the tape during operation. Therefore, if a thin paper tape is used in the cartridge of the present invention, the tape won't break and far longer tape can be wound in the cartridge. Moreover, the construction of the cartridge is simple, and the production cost is moderate. One embodiment of the present invention will be explained below with reference to the accompanying drawings, in which.

Detailed explanation of the embodiments of the present invention will be given below, referring to the attached drawings.

Figure 1:
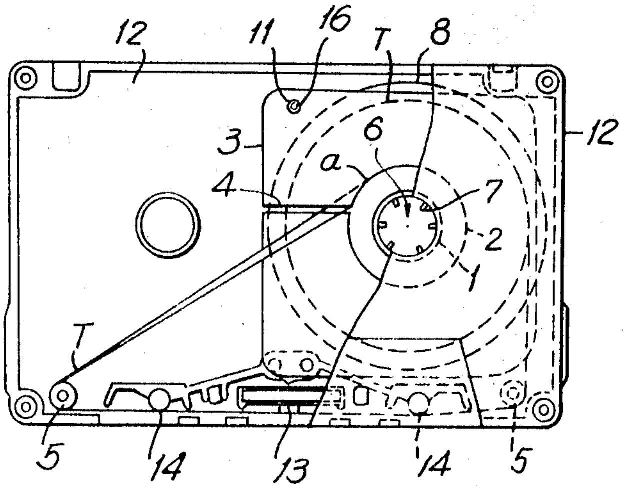
FIG. 1 is a plan view of the cartridge whose part is cut away.
Figure 2:
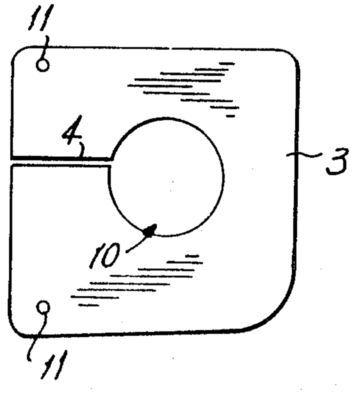
FIG. 2 is a plan view of a guide for leading out the tape.
Figure 3:
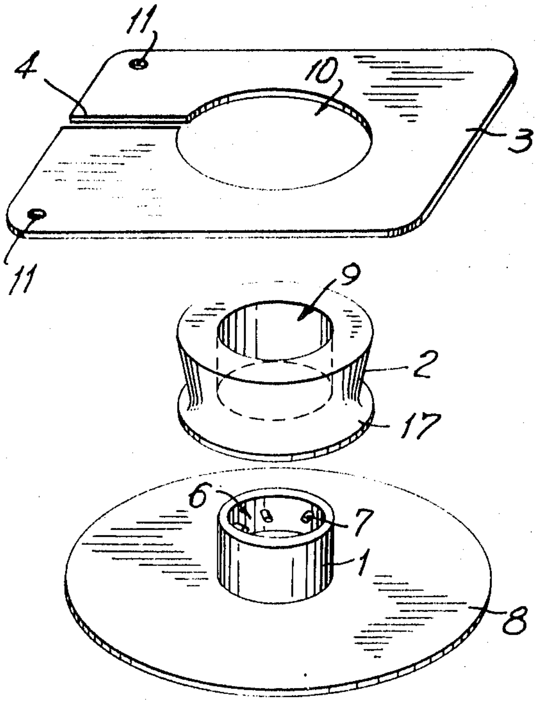
FIG. 3 is a perspective view of a separated guide roll.
Figure 4:
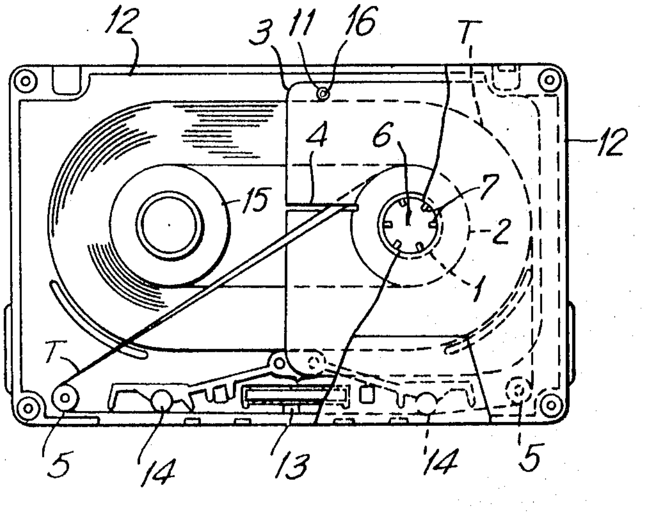
FIG. 4 is a plan view of the cartridge of other embodiment of the present invention whose part is cut away.

In FIGS. 1 and 3, a double hub is constituted by mounting rotatably an outer hub 2 as a driven wheel on the periphery of an inner hub as a driving wheel for taking up the tape. The wound tape is formed by winding an endless tape T on the periphery of the outer hub 2. An antifriction sheet 3 is fixedly fitted over the innermost portion of the endless tape T wound on the periphery of the outer hub 2, namely, provided at the pulling-out position *a* of the wound tape. An engaging slit for leading out the tape 4 is installed on an antifriction pad 3 to pass the tape T pulled out from the tape wound on the above mentioned hub through the engaging slit 4 smoothly. The pulled-out tape T is guided on the upper face of the antifriction pad 3 and a guide roll 5 to be rewound on the outer periphery of the multiplied convolutions of the wound tape on the above hub 2.

In the embodiments shown in the drawings, an inner hub 1 is provided with a shaft hole 6 in its center. A projected pawl for driving 7 as well as provided in the shaft hole 6 are provided a driving pawl 7 and a plate 8 made of Teflon or polyacetal resin, etc. It is convenient to make the plate 8 circular to use it as a revolving plate. In the embodiments disclosed, the plate 8 is fixed on the inner hub 1, but it can be fittingly engaged or jointed fixedly to the inner hub 1. On the other hand, the inner hub 1 is fitted into a fitting hole 9 of the outer hub 2 with a slight clearance between both hubs 1 and 2 so as to be revolved in a planetary manner due to partial friction therebetween. However, the hub of double construction can be constituted by mounting rotatably the outer hub 2 on the inner hub 1 with cushion pads such as felt, etc. or rolling elements such as a cylindrical roller, ball, etc. in the clearance.

Meantime, it is convenient to use the antifriction pad 3 made of lubricating sheet such as Teflon, graphite-Telfon, etc. The antifriction pad is provided with a hole 10 fittable over the outer periphery of the outer hub (a hole fittable over the shaft hole 6, if so desired) and a slit as an engaging element 4 to pass the pulled tape T, which connects to the above mentioned hole 10. It is enough for the engaging slit 4, if the tape is led out keeping it on the antifriction pad. For example, the engaging slit 4 can be formed in the shape of a partial cut, a groovelike notched hole or window. However, as shown in the embodiments shown in the drawings, it may be convenient to make the slit wide so as to make the assembly of the antifriction pad 3 easier on the cartridge during the winding-up operation of the tape T. The slit can be formed in any shape.

The lubricating sheet is provided with pinholes 11 for fitting it in place. Owing to the pinholes 11, the sheet is fixed firmly, when it is fitted in the case. However, other methods can be adopted, should the sheet by fixed surely in the case, for example, the sheet itself can be so shaped as to be just fitted to the case ensuring the fixture of the sheet therein, or supporting or fitting the sheet in the fitting hole of the case without slip.

In the drawings, 12 is a cartridge case which can be split into two parts. 13 is a pad. 14 is a hole for receiving a capstan roller. 15 is an auxiliary hub to be installed, if so desired. When the auxiliary hub is used, the amount of the tape accommodated in the cartridge can be increased greatly. 16 is a pin for fixing the antifriction sheet. It is convenient to use projected parts on the case 12 as the pins. 17 is a flange which is provided at the outer hub 2.

Meanwhile, the outer periphery of the outer hub 2 can be tapered so as to make the takeup of of the wound tape more smoothly. On the other hand, the guide roll 5 can be inclined to any degree to make the correction of the twists of the running tape and the reversion of the tape easier.

When the driving wheel 1 revolves, the tape T is wound up on the driven wheel 2 to be led out of the pulling-out portion *a*. The pulled-out tape passes the underside of the lubricating sheet as he antifriction pad 3 and the engaging slit 4 to feed the tape T along the upper side of the lubricating sheet, running easily in various ways, finally to be wound up on the outer periphery of the multiplied convolutions of the wound tape through the guide roll 5. However, when the hub of the driven wheel 2 revolves and at the same time the tape T is pulled out, the tape T tends to be pulled in the revolutional direction of the hub. But, in this case, as the tape T passes through the engaging slit 4 of the lubricating sheet smoothly, the tape T is pulled automatically on the upper face of the sheet to be taken out and fed smoothly in various ways without a fear to be pulled under the lower face of the sheet. Thus the tape T can be supplied to the recording and playback unit, and can be rewound on the outer periphery of the wound tape. In this case, the driven wheel revolves planetarily on the outer periphery of the driving wheel 1 (the driven wheel revolves at a slower revolutional speed than that of the driving wheel 1) to pull out the tape T more easily and smoothly.

We claim:

1. Endless tape cartridge of dual hub construction comprising, a driving inner hub, bored for reception of a drive shaft, a drive-pawl within the bore of said inner hub, a plate of low-friction material fixed to and coaxial with said inner hub, said plate serving to support said endless tape in wound condition, an outer hub having an inverted, tapered outer periphery, rotatably mounted on the outer periphery of said inner hub, said endless tape being wound on the outer periphery of said outer hub, torque-transmitting means for transmitting torque from said inner hub to said outer hub while permitting slippage therebetween, and an antifriction pad of a material of low coefficient of friction mounted immediately above said wound tape and having therein a slit positioned to permit transit thereof by tape drawn from the convolution in contact with the outer periphery of said outer hub and passage of said tape slidingly across the upper surface of said antifriction pad.

2. Endless tape cartridge as defined in claim 1, wherein the material of said antifriction pad is selected from the group consisting of Teflon and polyacetal resin.

3. Endless tape cartridge as defined in claim 1, further comprising an inclined guide wheel mounted between the faces of said cartridge and positioned to receive said tape directly from passage across said antifriction pad and serving to rotate the plane of the tape through approximately 90°.

4. Endless tape cartridge as defined in claim 1, wherein said torque-transmitting means is felt positioned between said inner and outer hubs.

5. Endless tape cartridge as defined in claim 1, wherein said torque-transmitting means comprises rolling elements positioned between said inner and outer hubs.

6. Endless tape cartridge as defined in claim 5, wherein said rolling elements are cylindrical rollers, positioned between said inner and outer hubs.

7. Endless tape cartridge as defined in claim 5, wherein said rolling elements are balls positioned between said inner and outer hubs.